United States Patent [19]

Tsunoda

[11] Patent Number: 4,737,988
[45] Date of Patent: Apr. 12, 1988

[54] CURRENT SUPPLY CIRCUIT

[75] Inventor: Yuzuru Tsunoda, Koganei, Japan

[73] Assignee: Iwatsu Electric Co., Ltd., Tokyo, Japan

[21] Appl. No.: 24,897

[22] Filed: Mar. 12, 1987

Related U.S. Application Data

[63] Continuation of Ser. No. 693,780, Jan. 23, 1985, abandoned.

[30] Foreign Application Priority Data

Jan. 26, 1984 [JP] Japan .................................. 59-11023

[51] Int. Cl.⁴ .......................................... H04M 19/00
[52] U.S. Cl. .................................... 379/413; 379/324
[58] Field of Search ............... 379/322, 324, 413, 405, 379/400, 399, 398, 395

[56] References Cited

U.S. PATENT DOCUMENTS

| | | | |
|---|---|---|---|
| 3,916,110 | 10/1975 | Lee et al. | 379/413 |
| 4,203,009 | 5/1980 | Tattersall | 379/399 |
| 4,525,602 | 6/1985 | Robra et al. | 379/413 X |

FOREIGN PATENT DOCUMENTS

| | | |
|---|---|---|
| 2020527 | 12/1970 | Fed. Rep. of Germany . |
| 2624021 | 12/1977 | Fed. Rep. of Germany . |
| 2920792 | 12/1979 | Fed. Rep. of Germany . |
| 0002109 | 8/1977 | Japan . |
| 0115769 | 9/1980 | Japan . |
| 1251150 | 10/1971 | United Kingdom . |

Primary Examiner—Jin F. Ng
Assistant Examiner—R. Vaas
Attorney, Agent, or Firm—Emmanuel J. Lobato; Robert E. Burns

[57] ABSTRACT

A current supply circuit for supplying a speech current via subscriber's lines to a telephone set, in which a pair of constant-current circuits, each so constituted as to hold the potential between the base and the emitter of a control transistor therein to be consant, is connected across the subscriber's lines so that the control transistors are connected in series to a DC power source. A constant-voltage circuit is connected across the bases of the control transistors for making the voltage of the base-emitter paths of each of the control transistors to be constant. At least one of the constant-current circuits may be connected across the subscriber's lines via a light emitting diode of a photo coupler.

3 Claims, 4 Drawing Sheets

CURRENT SUPPLY CIRCUIT

This is a continuation of our copending application Ser. No. 693,780, filed Jan. 23, 1985, now abandoned.

BACKGROUND OF THE INVENTION

The present invention relates to a current supply circuit used in a telephone exchange for supplying a current to subscriber's terminals.

Conventional current supply circuits of the type have such disadvantages as bulkiness, heavy weight, lack of a current limiting function, a low impedance, a large attenuation of an AC signal and, low speech performance.

SUMMARY OF THE INVENTION

An object of the present invention is to provide a current supply circuit which is free from the abovesaid disadvantages of the prior art, small in size, lightweight, simple in the winding structure of a transformer and excellent in the value of impedance and in the longitudinal balance and does not permit a large current flow even if the wires form a short-circuit.

To attain the above object of the present invention, there is provided a current supply circuit for supplying a speech current via subscriber's wires to a telephone set, characterized in that a pair of constant-current circuits, each so constituted as to hold the potential between the base and the emitter of a control transistor therein to be constant, is connected across the subscriber's wires so that the control transistors are connected in series to a DC power source, and that constant-voltage means is connected across the bases of the control transistors for making the voltage of the base-emitter paths of each of said control transistors to be constant. At least one of the constant-current circuits is connected across the subscriber's line via a light emitting diode of a photo coupler.

BRIEF DESCRIPTION OF THE DRAWINGS

The present invention will be described in detail below in comparison with conventional art with reference to the accompanying drawings, in which.

DETAILED DESCRIPTION

To make differences between conventional art and the present invention clear, examples of conventional art will first be described.

Conventional current supply circuits of this type are such as shown in FIGS. 1, 2, 3 and 4.

Figure 1:
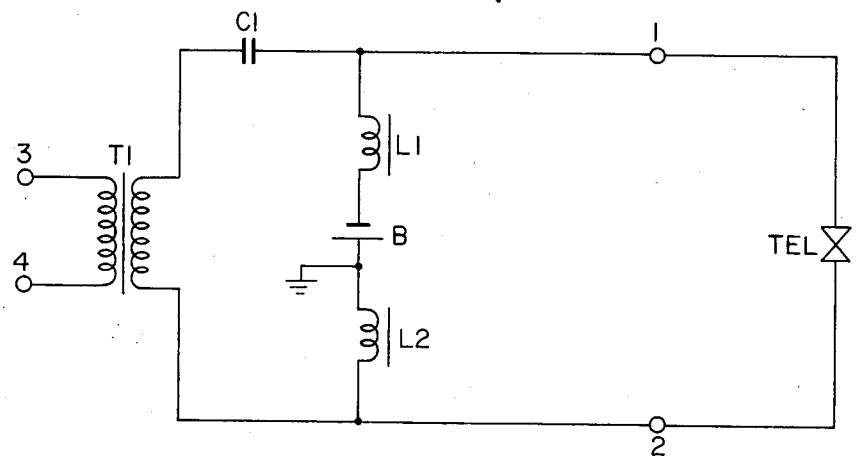
FIG. 1 is a circuit diagram of a conventional current supply circuit employing choke coils.

The circuit of FIG. 1 employs choke coils. Terminals 1 and 2 have connected thereto a pair of telephone wires, and TEL is a telephone set or an equivalent. Reference B is a DC power source, L1 and L2 choke coils of the same inductance, C1 a DC blocking capacitor for preventing from the flowing of a direct current of the DC power source B in windings of a transformer T1, and T1 a transformer for AC signal transmission. Terminals 3 and 4 are connected to a device which employs this current supply circuit. In this circuit, a direct current flows via a route [B→L2→2→TEL→1→L1]. In order to decrease the attenuation of an AC signal, such as a speech signal of the telephone set TEL, and to improve a longitudinal balance, it is necessary that the choke coils L1 and L2 be high in impedance and electromagnetically equal to each other. Furthermore, their great DC resistances cause large voltage drops, resulting in increased losses. To meet these conditions, the choke coils L1 and L2 inevitably become bulky and heavy. Moreover, the current of the DC power source B is limited by the DC resistances of the choke coils L1 and L2, the internal resistance of the telephone set TEL and the resistances of the lines from the terminals 1 and 2 to the telephone set TEL. In general, the direct current of the DC power source B varies with the line resistance. If the terminals 1 and 2 form a short-circuit, then an excessive direct current is likely to flow. As described above, the prior art example of FIG. 1 is excellent in the impedance against an AC signal and in the longitudinal balance but has the defects of bulkiness and heavy weight and lacks a current limiting function.

Figure 2:
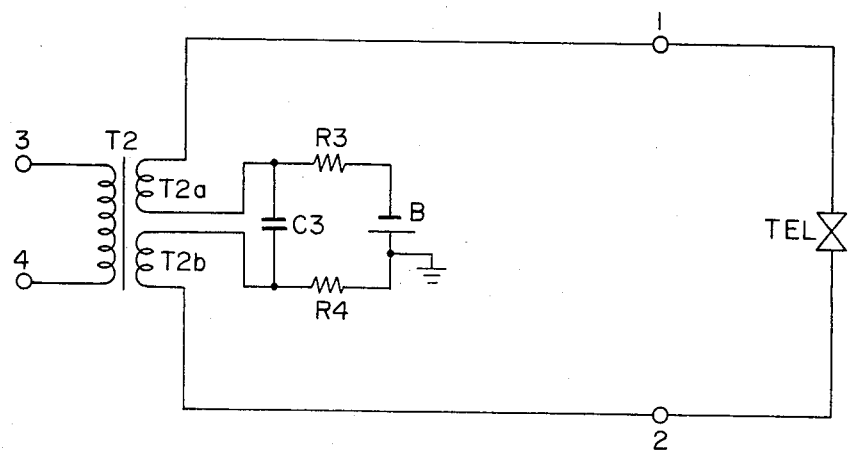
FIG. 2 is a circuit diagram of another conventional current supply circuit employing a transformer.

FIG. 2 is a circuit which employs a transformer and feeds from the midpoint of its winding. The secondary winding of a transformer T2 is divided into windings T2a and T2b. The two divided windings T2a and T2b are equal electrically and magnetically to each other. Resistors R3 and R4 are current limiting resistors for limiting the direct current of the DC power source B to an appropriate value. In general, the resistors R3 and R4 are of the same value. A capacitor C3 is to pass therethrough a voice signal or the like from the telephone set TEL. In the absence of the capacitor C3, the voice signal or the like passes through the resistors R3 and R4, by which it is attenuated; therefore, the capacitor is used to prevent this. In this circuit, a direct current flows via a route [B→R4→T2b→2→TEL→1→T2a→R3→B]. In order to improve balance of the AC signal as for the speech signal from the telephone set TEL, it is necessary that the divided windings T2a and T2b of the transformer T be electrically and magnetically equal to each other. If the DC resistances of the windings are large, then voltage drops of the direct current flowing through the windings become large, increasing the loss. Moreover, the working attenuation of the transformer T2 also increases. In addition, since a direct current flows through the windings of the transformer T2, there is a disadvantage also in the DC magnetization of the core of the transformer T2. To fulfil these conditions, the transformer T2 is inevitably bulky and heavy. Furthermore, when the lines to the telephone set TEL form a short-circuit, there is a fear of an excessive current flowing from the DC power source B as in the case of the circuit shown in FIG. 1. As described above, the prior art example of FIG. 2 is excellent in the longitudinal balance for the AC signal but possesses the disadvantages of low impedance, large attenuation of an AC signal, bulkiness and heavy weight and lacks the current limiting function.

Figure 3:
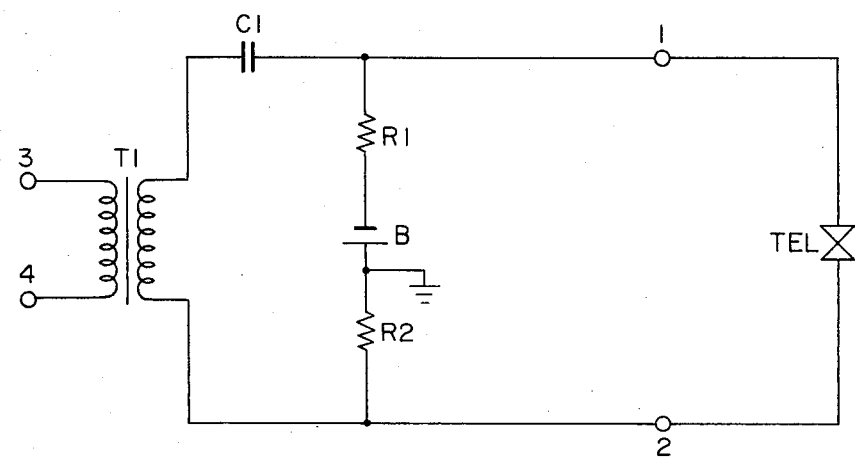
FIG. 3 is a circuit diagram of another conventional current supply circuit employing resistors.

FIG. 3 illustrates a circuit which employs resistors R1 and R2 in place of the choke coils L1 and L2 in FIG. 2. This circuit is identical in operation with the prior art example of FIG. 1. In this circuit, the values of the resistors R1 and R2 have to be increased for raising the impedance of the DC supply circuit. However, an increase in the resistance value causes an increase in the voltage drop of the direct current, resulting in an increased loss. On account of this, the upper limit of the values of the resistors R1 and R2 is several hundred ohms in practice, and consequently, the impedance is appreciably lower than in the circuit of FIG. 1. Furthermore, in order to improve the longitudinal balance, it is necessary to minimize an error between the respective values of the resistors R1 and R2; however, such resistors are difficult to fabricate.

In connection with the current limitation, there is also the possibility of an excessive current as is the case with the prior art example shown in FIG. 1. This circuit is simple in construction and small in size, but since the impedance of the DC supply circuit cannot be increased, the AC signal as for speech is attenuated and the longitudinal balance is degraded, resulting in the defect of low speech performance.

Figure 4:
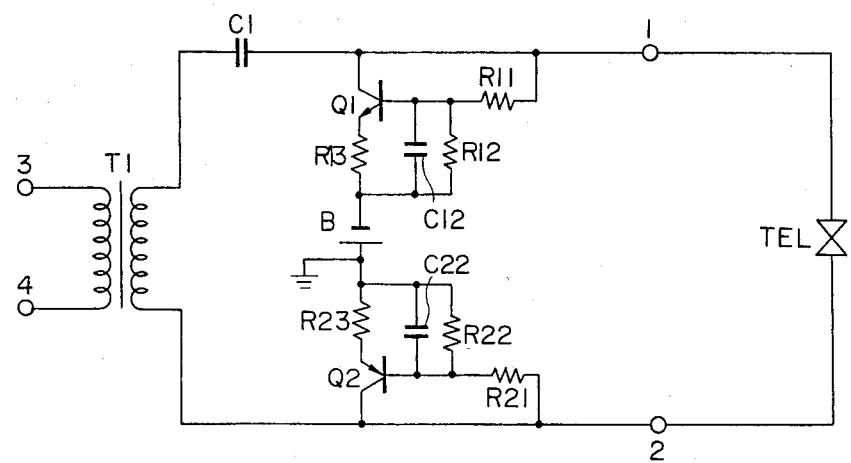
FIG. 4 is a circuit diagram of still another conventional current supply circuit employing transistors.

FIG. 4 shows a circuit which employs transistors. This circuit utilizes impedances between the collectors and emitters of transistors Q1 and Q2 instead of using the choke coils L1 and L2 in the prior art example shown in FIG. 1. In this circuit, the direct current flows via a route [B→R23→emitter and collector of Q2→2→TEL→1→collector and emitter of Q1→R13→B].

REsistors R11 and R12 are used to determine the working point of the transistor Q1, and resistor R13 determines the value of the collector current of the transistor Q1. Resistors R21, R22 and R23 provided on the side of the transistor Q2 are also used for similar purposes. The transistor Q1 is an NPN transistor and the transistor Q2 is a PNP transistor. The circuit structure is symmetrical with respect to the DC power source B. Capacitors C12 and C22 makes the AC impedance of the base-emitter path of each transistor to be low, thereby stabiling the operations of the transistors Q1 and Q2. In this circuit, the AC impedance of the collector is relatively high, but the DC impedance thereof cannot be raised high. The direct current from the DC power source B depends upon the values of the resistors in the abovesaid route and varies in value. On account of this, the values of the resistors R11 and R21 cannot be made very large because a base current high enough to permit a sufficient collector current flows. If the base current is insufficient, then the working point of the transistor gets out of a linear region and the collector impedance against the alternating current greatly lowers and cannot be used for the speech signal or the like. A short-circuit between the terminals 1 and 2 causes an increase in the current of the DC power source B as compared with the current in the case of the telephone set TEL being connected. In this state, since voltage of the DC power source B is mostly applied to the emitter-collector paths of the transistors Q1 and Q2 to cause their abnormal heat generation, some measures must be taken for protection. As described above, the prior art example of FIG. 4 is small and light-weight but insufficient in the speech path impedance and in the longitudinal balance and calls for protection from a short-circuit of the wires connected to the telephone set TEL.

The present invention will hereinafter be described in detail.

Figure 5A:
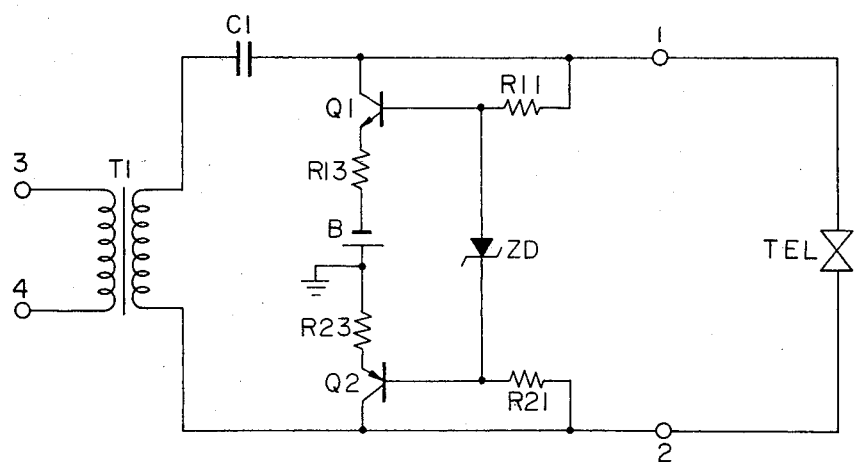
FIG. 5A is a circuit diagram of an embodiment of the current supply circuit of the present invention.

FIG. 5 illustrates an embodiment of the present invention. According to this embodiment, in the current supply circuit for supplying current via a subscriber's line to a telephone set, a pair of constant-current circuits, each so formed as to maintain constant the potential between the base and emitter of one of control transistors Q1 and Q2, are connected to the subscriber's wires (between the terminals 1 and 2) so that the control transistors Q1 and Q2 are connected in series to the DC power source B. Further, a constant-voltage diode ZD for retaining a voltage between the base and emitter of each of the control transistors Q1 and Q2 constant is connected across the bases of the transistors Q1 and Q2.

A description will be given of the operation of this embodiment. The current from the DC power source B flows via a route [B→R23→emitter-collector path of Q2→2→TEL→1→collector-emitter pach of Q1→B].

The constant-voltage diode ZD is being supplied with a voltage across the terminals 1 and 2 which is lowered by voltage drops across the resistors R11 and R12. This voltage remains unchanged even if the voltage across the terminals 1 and 2 varies. Accordingly, if the voltage of the DC power source B is constant, then the voltage across the base and emitter of the transistor Q1 and the voltage across the resistor R13 remain constant. The same is true with the transistor Q2 and the resistor R23.

Figure 7:
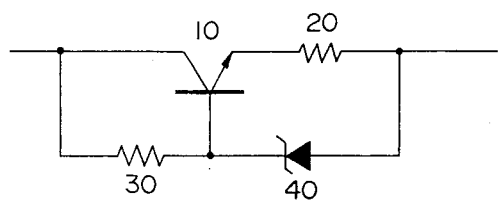
FIG. 7 is a circuit diagram explanatory of the principles of a constant-current circuit for use in the present invention.

In this embodiment, the circuits of the transistors Q1 and Q2 are each a constant-current circuit, which can be represented as shown in FIG. 7. To facilitate the better understanding of the present invention, a description will be given of the circuit shown in FIG. 7.

A current is flowing from the collector to the emitter of a transistor 10 and the base current is flowing via a resistor 31 to the transistor 10. In addition, a resistor 20 causes a voltage drop according to the current flowing thereacross, and this circuit operates so that the total sum of the voltage across the base and the emitter of the transistor 10 and the voltage across the resistor 20 becomes equal to the voltage of a constant-voltage diode 40. In the case where a current increases and the voltage drop across the resistor 20 increases, the voltage across the constant-voltage diode 40 is raised to conduct it and a portion of the base current of the transistor 10 flows in the constant-voltage diode 40, by which the base current is limited. Accordingly, by selecting the voltage across the collector and the emitter of the transistor 10 and the values of the resistors 20 and 30 so that the circuit performs such an operation, this circuit operates as a constant-current circuit.

Accordingly, in the circuit of FIG. 5, the transistors Q1 and Q2 each constitute a constant-current circuit, and a voltage source on which its constant current is based is the diode ZD. The value of this constant current is common to the transistors Q1 and Q2. Consequently, the collectors of the transistors Q1 and Q2 have the same impedance against DC and AC signals.

Moreover, since the transistors Q1 and Q2 perform constant-current control, the current of the DC power source B can be determined by the voltage of the DC power source B and the values of the constant-voltage diode ZD and the resistors R13 and R23 regardless of the resistances of the lines from the terminals 1 and 2 to the telephone set TEL. Accordingly, in this circuit, the impedance of the speech path can be made very high. Therefore, the longitudinal balance can also be made large.

Besides, since the constant-current control is effected, even if the terminals 1 and 2 form a short-circuit, no excessive current flows; this suppresses heat generation of the transistors Q1 and Q2 in the case of the wires forming a short-circuit, as compared with the heat generation in the circuit of FIG. 4.

Figure 5B:
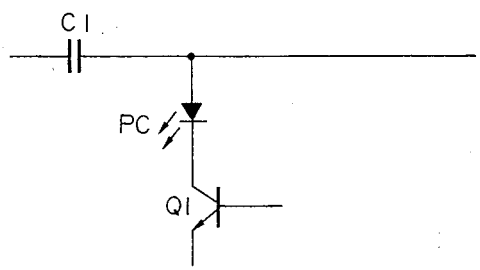
FIG. 5B is a circuit diagram of a photo coupler used in a modified form of the embodiment shown in FIG. 5A.
Figure 6:
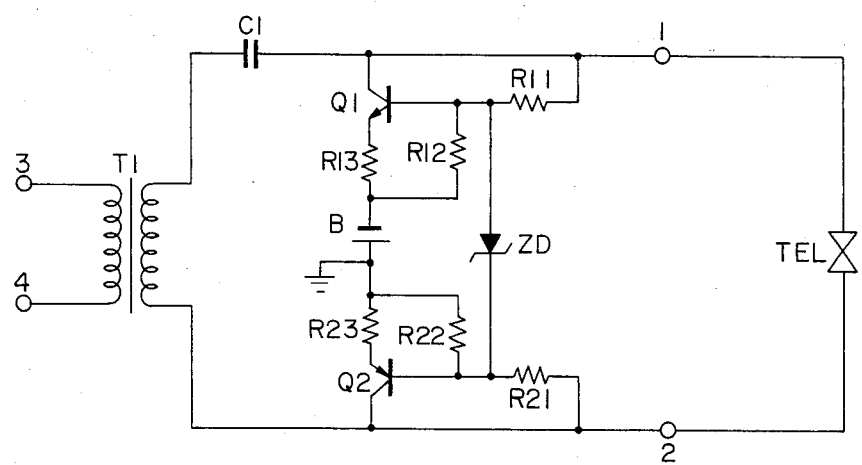
FIG. 6 is a circuit diagram of another embodiment of the present invention.

In the case of employing a photo coupler for detecting the presence or absence of a speech current, the light emitting side of the photo coupler is connected between the collector of the transistor Q1 or Q2 and the speech path. An example of this is illustrated in FIG. 5B. The insertion of the photo coupler has no influence upon the impedance of the speech path. When the photo coupler is connected to either one of the transistors Q1 and Q2, degradation of the longitudinal balance is expected, but since the constant-current circuit itself has a very high impedance, substantially no influence is exerted on the impedance of the speech path. FIG. 5B shows an example in which the photo coupler PC is connected to the collector side of the transistor Q1, and the light detecting side of the photo coupler is omitted.

The constant-voltage diode ZD may also be substituted by constant-voltage means having a resistor connected in series to a constant-voltage diode, or constant-voltage means such as a battery.

As has been described in the foregoing, according to the present invention, the impedance of the speech path (between the terminals 1 and 2) can be raised very high for DC and AC signals, and even if a photo coupler for detecting a speech current is connected, the impedance of the speech path is not affected. Accordingly, it does not exert any influence on talking operations, and the longitudinal balance is also excellent.

What we claim is:

1. A current supply circuit for a speech current through a pair of subscriber's telephone wires connected to a telephone set comprising, a pair of symmetrical constant-current circuits connected across the pair of telephone wires, each constant-current circuit having a respective control transistor and a base-resistor, a DC power source relative to which the constant-current circuits are connected symmetrically, the DC powre source being connected between respective emitters of the control transistors of the constant-current circuits, each collector of each control transistor being connected to a respective one of said telephone wires, each base-resistor being connected between a base of a respective control transistor and a respective one of said telephone wires to which the collector of the respective control transistor is connected, and a constant-voltage diode connected between bases of the control transistors effective to maintain constant voltage across a base emitter path of each said control transistor.

2. A current supply circuit for a speech current through a pair of a subscriber's telephone wires connected to a telephone set according to claim 1, in which said constant voltage diode comprises a zener diode.

3. A current supply circuit for a speech current through a pair of a subscriber's telephone wires connected to a telephone set comprising, a pair of symmetrical constant-current circuits connected across the pair of telephone wires, each constant-current circuit having a respective control transistor and a base resistor, a DC power source relative to which the constant-current circuits are connected symmetrically, the DC power source being connected between respective emitters of teh control transistors of the constant-current circuits, means for connecting each constant-current circuit control transistor to a respective one of said telephone wires, said means comprising a photo coupler having a light-emitting diode connecting one of said control transistors to a respective telephone wire, each base-resistor being connected between the base of a respective control transistor and a respective one of said telephone wires to which a collector of the corresponding control transistor is connected, and constant-voltage means connected between the bases of the control transistors effective to maintain constant voltage across base emitter paths of said control transistors.

* * * * *